(12) United States Patent
Laucournet et al.

(10) Patent No.: US 11,078,579 B2
(45) Date of Patent: Aug. 3, 2021

(54) COMPONENT CONSTITUTING AN HTE ELECTROLYSER INTERCONNECTOR OR SOFC FUEL CELL INTERCONNECTOR AND ASSOCIATED PRODUCTION PROCESSES

(71) Applicant: COMMISSARIAT A L'ENERGIE ATOMIQUE ET AUX ENERGIES ALTERNATIVES, Paris (FR)

(72) Inventors: Richard Laucournet, La Buisse (FR); Myriam Dalmasso, Gieres (FR); Cyril Rado, Grenoble (FR)

(73) Assignee: COMMISSARIAT A L'ENERGIE ATOMIQUE ET AUX ENERGIES ALTERNATIVE, Paris (FR)

( * ) Notice: Subject to any disclaimer, the term of this patent is extended or adjusted under 35 U.S.C. 154(b) by 0 days.

(21) Appl. No.: 16/799,220

(22) Filed: Feb. 24, 2020

(65) Prior Publication Data
US 2020/0208275 A1 Jul. 2, 2020

Related U.S. Application Data

(62) Division of application No. 14/429,610, filed as application No. PCT/IB2013/058814 on Sep. 24, 2013, now abandoned.

(30) Foreign Application Priority Data

Sep. 26, 2012 (FR) .................................. 1259040

(51) Int. Cl.
*H01M 2/20* (2006.01)
*C25B 1/04* (2021.01)
(Continued)

(52) U.S. Cl.
CPC .................. *C25B 1/04* (2013.01); *C25B 9/65* (2021.01); *C25B 9/70* (2021.01); *C25B 11/036* (2021.01);
(Continued)

(58) Field of Classification Search
CPC .. C25B 1/04; C25B 9/18; C25B 9/063; C25B 9/04; Y02P 70/56; Y02E 60/50;
(Continued)

(56) References Cited

U.S. PATENT DOCUMENTS 4,950,562 A 8/1990 Yoshida
5,376,472 A 12/1994 Hartvigsen
(Continued)

FOREIGN PATENT DOCUMENTS

| CA | 2567673 | 5/2007 |
|---|---|---|
| EP | 0338823 | 10/1989 |

(Continued)

OTHER PUBLICATIONS

Ardigo, "Optimisation d'interconnecteurs metalliques pour la production d'hydrogene par electrolyse de la vapeur d'eau a haute temperature (EVHT) [Optimization of metallicinterconnectors for the production of hydrogen by high-temperature steam hydrolysis (HTSE)]", Doctoral thesis defended on Sep. 9, 2012 (French with English Translation).

(Continued)

*Primary Examiner* — Michael L Dignan
(74) *Attorney, Agent, or Firm* — Norton Rose Fulbright US LLP

(57) ABSTRACT

The invention relates to a component (8) comprising a substrate made of chromia-former metal alloy (82), the basic element of which is iron (Fe) or nickel (Ni), wherein the substrate has two main planar faces. According to the invention: one of the main planar faces is coated with a coating comprising a thick layer of ceramic (80), grooved to delimit channels (800) suitable for the distribution and/or collection of gases, such as $H_2O$ water vapour, $H_2$ or air, and/or one of the main planar faces is coated with a thick metal layer (81), grooved to delimit channels (810) suitable (Continued)

for the distribution and/or collection of gases, such as $H_2O$ water vapour, $H_2$, $O_2$ or draining gas. The invention also relates to the associated production processes.

17 Claims, 6 Drawing Sheets

(51) Int. Cl.

| | |
|---|---|
| *H01M 8/2425* | (2016.01) |
| *H01M 8/026* | (2016.01) |
| *H01M 8/021* | (2016.01) |
| *H01M 8/0228* | (2016.01) |
| *H01M 8/0217* | (2016.01) |
| *C25B 9/65* | (2021.01) |
| *C25B 9/70* | (2021.01) |
| *C25B 11/036* | (2021.01) |
| *H01M 50/502* | (2021.01) |
| *H01M 8/04082* | (2016.01) |
| *H01M 8/12* | (2016.01) |
| *H01M 8/124* | (2016.01) |

(52) U.S. Cl.
CPC ............ *H01M 8/021* (2013.01); *H01M 8/026* (2013.01); *H01M 8/0217* (2013.01); *H01M 8/0228* (2013.01); *H01M 8/04216* (2013.01); *H01M 8/12* (2013.01); *H01M 8/2425* (2013.01); *H01M 50/502* (2021.01); *H01M 2008/1293* (2013.01); *Y02E 60/36* (2013.01); *Y02P 70/50* (2015.11)

(58) Field of Classification Search
CPC ............... Y02E 60/525; Y02E 60/366; H01M 8/04216; H01M 8/12; H01M 8/24; H01M 2/202; H01M 8/021; H01M 8/0217; H01M 8/0228; H01M 2008/1293
See application file for complete search history.

(56) References Cited

U.S. PATENT DOCUMENTS

| | | | |
|---|---|---|---|
| 6,054,231 | A | 4/2000 | Virkar |
| 6,106,967 | A | 8/2000 | Virkar et al. |
| 6,280,868 | B1* | 8/2001 | Badwal ............... H01M 8/0206 429/487 |
| 6,326,096 | B1 | 12/2001 | Virkar et al. |
| 7,595,122 | B2 | 9/2009 | Balan |
| 7,645,535 | B2* | 1/2010 | Rehg ..................... C04B 37/025 429/513 |
| 8,790,847 | B2 | 7/2014 | Larsen |
| 2002/0004155 | A1 | 1/2002 | Haltiner |
| 2002/0048700 | A1 | 4/2002 | Virkar et al. |
| 2003/0231973 | A1* | 12/2003 | Krumpelt ............ H01M 8/0208 419/8 |
| 2004/0200187 | A1 | 10/2004 | Warrier et al. |
| 2006/0285993 | A1 | 12/2006 | Rakowski |
| 2007/0003812 | A1 | 1/2007 | Wende |
| 2007/0037037 | A1* | 2/2007 | Nguyen .............. H01M 8/0232 429/483 |
| 2007/0178004 | A1* | 8/2007 | Laatsch ............... H01M 8/0228 419/5 |
| 2008/0124602 | A1 | 5/2008 | Larsen |

FOREIGN PATENT DOCUMENTS

| | | |
|---|---|---|
| JP | H0250983 | 2/1990 |
| WO | WO 1996/028855 | 9/1996 |
| WO | WO 1997/035349 | 9/1997 |
| WO | WO 2010/085248 | 7/2010 |

OTHER PUBLICATIONS

Fergus, J.W., "Metallic interconnects for solid oxide fuel cells", Materials Science and Engineering, A 397 (2005) pp. 271-283.
Fontana, S. et al., "Metallic interconnects for SOFC: Characterisation of corrosion resistance and conductivity evaluation at operating temperature of differently coated alloys", Journal of Power Sources, vol. 171 (2007), pp. 652-662.
Geng, S.J. et al., "Investigation on Haynes 242 Alloy as SOFC Interconnect in Simulated Anode Environment", Electrochemical and Solid-State Letters, vol. 9 (4) (2006), pp. A211-A214.
Hammer, J.E. et al., "The Oxidation ofFerritic Stainless Steels in Simulated Solid-Oxide Fuel-Cell Atmospheres", Oxidation of Metals, vol. 67(1/2) (2007), pp. 1-38.
Hotza & Greil, "Review: aqueous tape casting of ceramic powders" *Materials Science and Engineering*, 1995, A202:206-217.
Li, Xiango et al., "Review of bipolar plates in PEM fuel cells: Flow-field designs", International Journal of hydrogen Energy, vol. 30 (2005), pp. 359-371.
Quadakkers, W.L. et al., "Metallic interconnectors for solid oxide fuel cells—a review", Materials at High Temperatures, vol. 20 (2) (2003), pp. 115-127.
Shaigan, Nima et al., "A review of recent progress in coatings, surface modifications and alloy developments for solid oxide fuel cell ferritic stainless steel interconnects", Journal of Power Sources, vol. 195 (2010), pp. 1529-1542.
Yang, Z. et al., "Selection and Evaluation of Heat-Resistant Alloys for SOFC Interconnect Applications", Journal of the Electrochemical Society, vol. 150 (9) (2003), pp. AI 188-AI201.

* cited by examiner

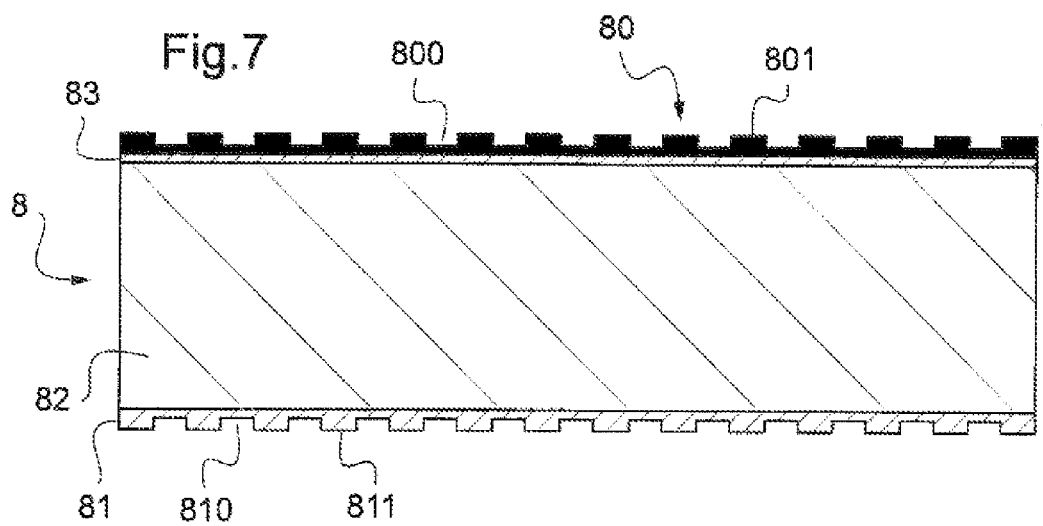
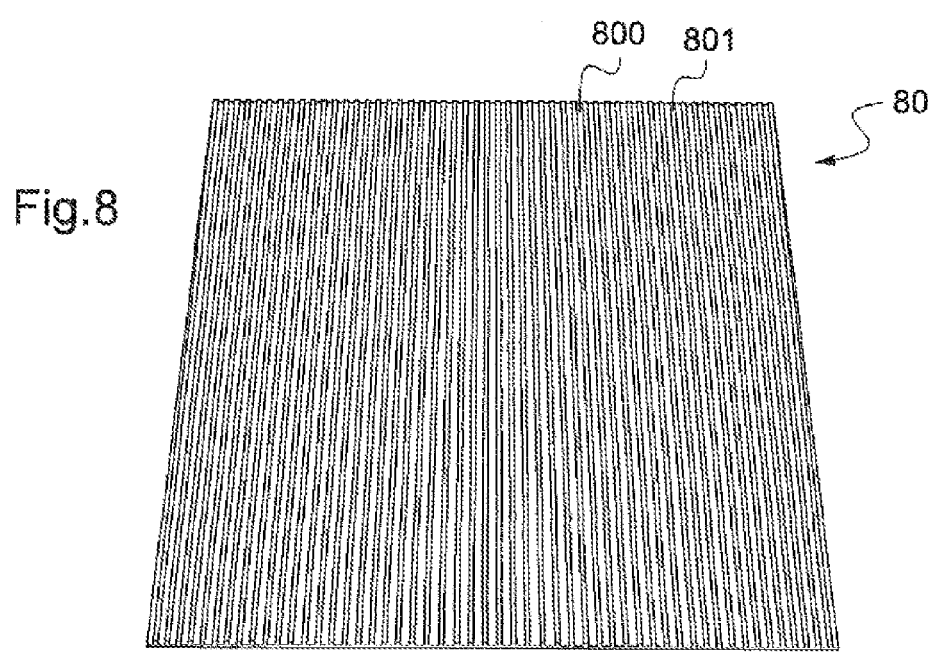

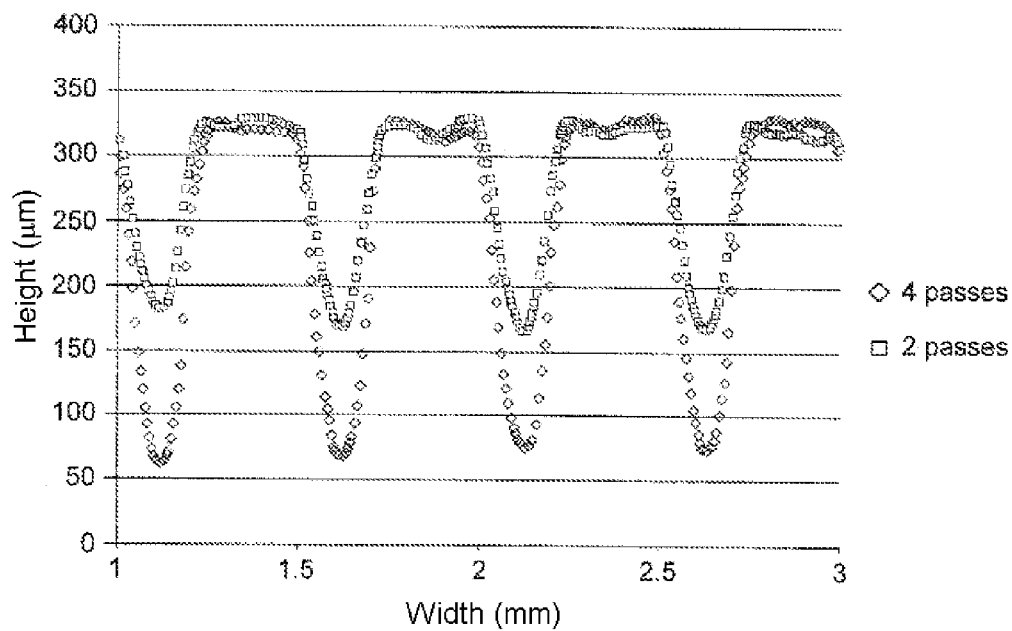
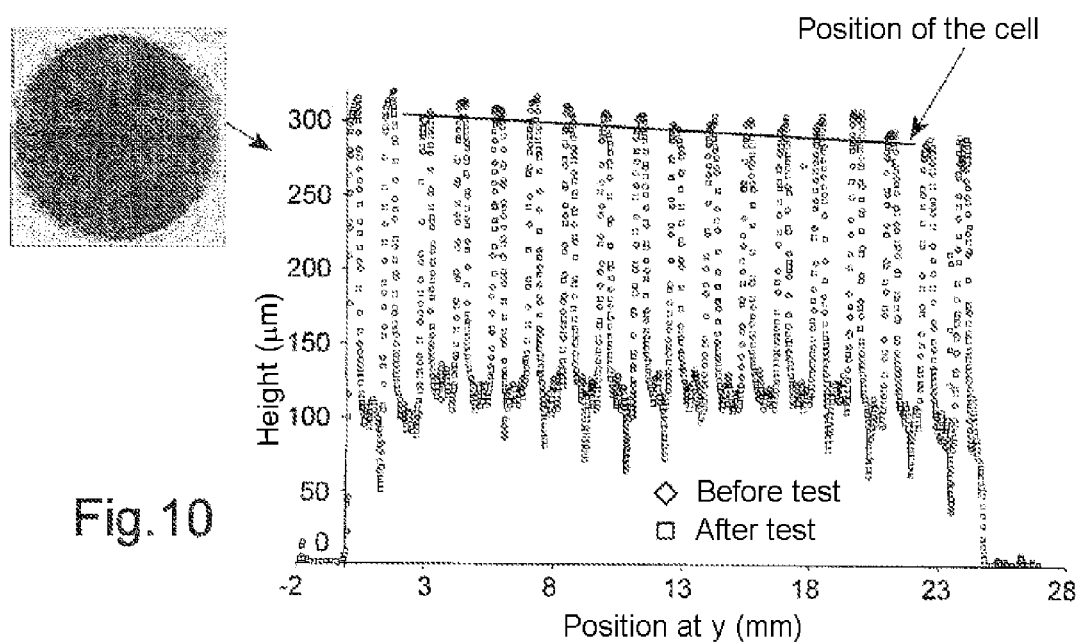
Profile in the direction perpendicular to the channels: before and after test

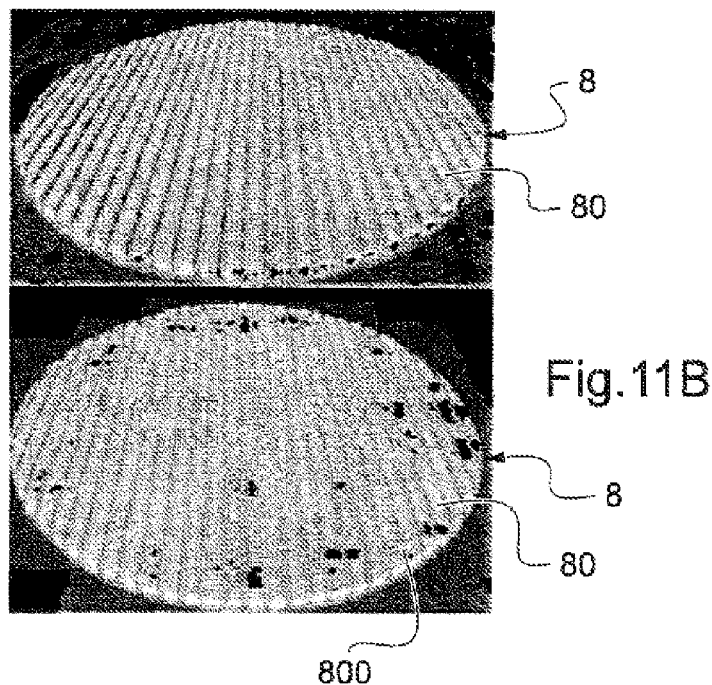
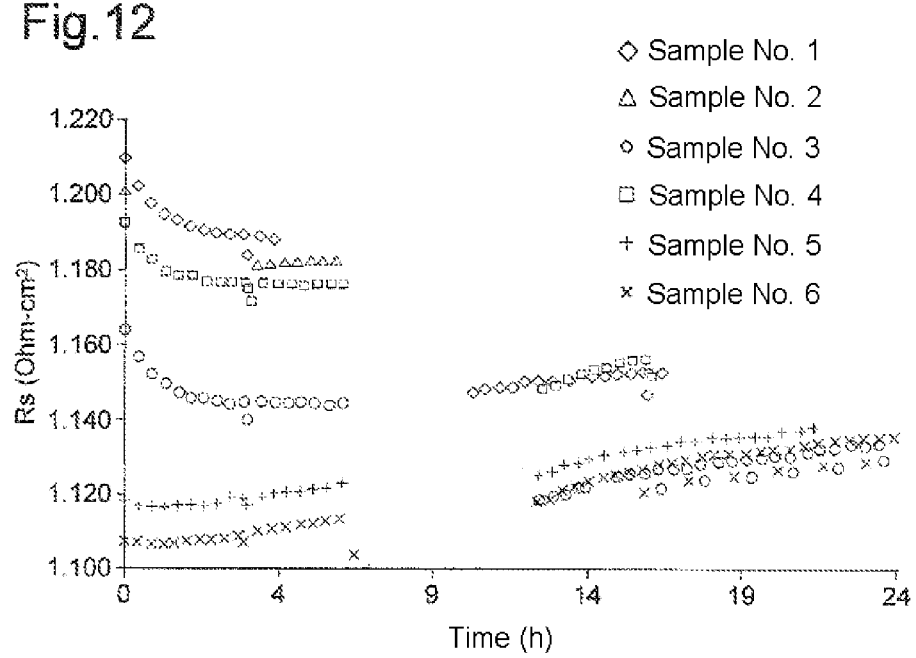

COMPONENT CONSTITUTING AN HTE ELECTROLYSER INTERCONNECTOR OR SOFC FUEL CELL INTERCONNECTOR AND ASSOCIATED PRODUCTION PROCESSES

CROSS-REFERENCE TO RELATED APPLICATIONS

This application is a divisional of U.S. application Ser. No. 14/429,610 filed 19 Mar. 2015, which is a national phase application under 35 U.S.C. § 371 of International Application No. PCT/IB2013/058814 filed 24 Sep. 2013, which claims priority to French Patent Application No. 1259040 filed 26 Sep. 2012. The entire contents of each of the above-referenced disclosures is specifically incorporated herein by reference without disclaimer.

BACKGROUND OF THE INVENTION

1. Technical Field

The present invention relates to the field of solid oxide fuel cells (SOFC) and to that of high-temperature electrolysis (HTE) or high-temperature steam electrolysis (HTSE).

The present invention relates to components made of metal alloy constituting interconnection devices that are subjected to high temperatures and, on the one hand, to a reductive atmosphere that is either rich in steam $H_2O/H_2$ (wet hydrogen or hydrogen rich in steam) in the HTE reactors or rich in $H_2$ in the SOFC cells, and, on the other hand, to an oxidizing atmosphere that is either rich in $O_2$ in the HTE reactors, or rich in air in the SOFC cells, one of the functions of which is to ensure the passage of the electrical current in the HTE reactors.

Electrical and fluidic interconnection devices, also known as interconnectors or interconnection plates, are devices that connect in series each electrochemical cell (electrolysis cell) in the stack of HTE reactors and cells, thus combining the production of each. The interconnectors thus ensure the functions of conveying and collecting current and delimit the circulation compartments (distribution and/or collection) of the gases.

In addition to these functions, the interconnectors must be able to withstand corrosion in atmospheres that may be very oxidizing in very high temperature ranges, typically between 600 and 900° C., such as atmospheres rich in steam $H_2O/H_2$ on the cathode side of HTE electrolyzers, which corrosion may be harmful to the durability of these electrolyzers.

In addition, the interconnectors must have in these atmospheres a thermomechanical behavior close to that of electrochemical cells so as to conserve good leaktightness between compartments with cathodes, known as the cathode compartments, and compartments with anodes, known as the anode compartments.

The present invention is more particularly directed toward simplifying the production of interconnectors, of interdigital or channel plate type, and of reducing the manufacturing cost thereof, so as to reduce the manufacturing cost of an HTE electrolyzer or of an SOCF fuel cell equipped therewith.

The invention is also directed toward improving the electrical contact between an interconnector and an electrochemical cell against which it bears.

2. Prior Art

An SOFC fuel cell or an HTE electrolyzer consists of a stack of elementary units each comprising a solid oxide electrochemical cell, consisting of three anode/electrolytic/cathode layers superposed one on the other and of interconnection plates made of metal alloys also known as bipolar plates, or interconnectors. The function of the interconnectors is to ensure both the passage of the electrical current and the circulation of the gases in the region of each cell (steam injected, hydrogen and oxygen extracted in an HTE electrolyzer; air and hydrogen injected and water extracted in an SOFC cell) and of separating the anode and cathode compartments which are the compartments for circulation of the gases on the anode and cathode side, respectively, of the cells.

To perform the HTE electrolysis of steam at high temperature, typically between 600 and 950° C., $H_2O$ steam is injected into the cathode compartment. Under the effect of the current applied to the cell, the dissociation of the water molecules in vapor form takes place at the interface between the hydrogen electrode (cathode) and the electrolyte: this dissociation produces dihydrogen gas $H_2$ and oxygen ions. The dihydrogen is collected and evacuated at the outlet of the hydrogen compartment. The oxygen ions $O_2$ migrate toward the electrolyte and recombine as dioxygen at the interface between the electrolyte and the oxygen electrode (anode).

To ensure the functioning of an SOFC fuel cell, air (oxygen) is injected into the cathode compartment and hydrogen is injected into the anode compartment. The hydrogen $H_2$ becomes converted into $H^+$ ions and releases electrons that are captured by the anode. The $H^+$ ions arrive at the cathode, where they combine with the $O_2$ ions constituted from the oxygen of the air, to form water. The transfer of the $H^+$ ions and of the electrons to the cathode produces a continuous electrical current from the hydrogen.

Since the conditions of functioning of an HTE electrolyzer are very similar to those of an SOCF fuel cell, the same technological constraints are found, i.e. mainly the mechanical strength with respect to the thermal cycles of a stack of different materials (ceramics and metal alloy), the maintenance of leaktightness between the anode and cathode compartments, the resistance to aging of the metal interconnectors and the minimization of the ohmic losses at various interfaces of the stack.

Chromia-forming ferritic stainless steels are among the interconnector alloys that are the most promising for HTE electrolyzers, given that they have already been successfully used as alloys in SOFC high-temperature fuel cells [1-3]. Among these interconnector alloys, those already commercialized under the names Crofer™ 22 APU and Crofer™ 22 H based on Fe-22% Cr, by the company ThyssenKrupp VDM, or the product having the name Sanergy™ HT based on Fe-22% Cr, by the company Sandvik, or alternatively the product under the name K41X by the company APERAM for operating temperatures of between 600 and 900° C.

Alloys of this type may have a coefficient of thermal expansion in the region of that of cell materials and relatively good corrosion resistance when compared with other metal materials. Nevertheless, it requires a certain number of coatings intended, firstly, to protect it against oxidation and to prevent the evaporation of the Cr under the operating conditions, which, on the oxidizing side, pollute the electrode with air and considerably degrade its function, and, secondly, a coating that makes it possible to minimize the electrical resistance between the interconnector and the cell.

It is known that the resistance to oxidation in air of these alloys is ensured by the formation of a surface layer of chromium-rich oxides (chromia $Cr_2O_3$ and spinel oxide $(Cr,Mn)_3O_4$) [4].

However, with such naked alloys, it is known that operating requirements are not fully satisfied over time for the application to interconnectors facing the oxygen electrode, i.e. SOCF cathode interconnectors and HTE anode interconnectors. Firstly, it appears that the area-specific resistance (ASR), linked to the collection of the current, thus becomes too high on the oxygen electrode side [1, 3]. Furthermore, the ASR in humid hydrogen, on the hydrogen electrode side, is greater than that in air [5]. Furthermore, the volatility of chromia $Cr_2O_3$ at the operating temperature causes poisoning of the HTE oxygen electrode (HTE anode), which is accompanied by a degradation in its performance, comparable to that observed for the SOCF oxygen electrode (SOCF cathode).

The literature thus describes coatings, on the one hand, for SOFC cell interconnectors, and, on the other hand, for the face of the interconnectors facing the oxygen electrode [6]. These coatings have the sole function of limiting the evaporation of chromium, of ensuring electron conduction and good resistance to oxidation of the alloy in air, i.e. in the atmosphere in cathode compartments of SOCF cells. Among these coatings, it is known practice to produce deposits conforming to the geometry of the interconnectors, of two conductive ceramic layers, one known as the protective layer whose function is to protect the metal alloy from oxidation (oxidizing compartment), and the second, known as the electrical contact layer, in order to improve the electrical contact between the interconnector and the cell, the planarity of which is often imperfect, the measured planarity error being from 10 to 20 microns.

As regards the geometry of the interconnectors, FIGS. 1, 1A and 1B show a channel plate 1 commonly used both in HTE electrolyzers and in SOFC fuel cells. The conveyance or collection of the current at the electrode is performed by the teeth or ribs 10 which are in direct mechanical contact with the electrode concerned. The introduction of steam at the cathode or of draining gas at the anode in an HTE electrolyzer, the introduction of air ($O_2$) at the cathode or of hydrogen at the anode in an SOCF cell is symbolized by the arrows in FIG. 1. The collection of the hydrogen produced at the cathode or of the oxygen produced at the anode in an HTE electrolyzer, the collection of the water produced at the cathode or of the excess hydrogen at the anode in an SOCF cell is performed by the channels 11 which emerge in a fluidic connection, commonly known as a manifold, which is common to the stack of cells. The structure of these interconnectors is made to achieve a compromise between the two functions of introduction and of collection (gas/current).

Another interconnecting plate 1 has already been proposed [7]. It is represented in FIG. 2 with the circulation of the fluid represented by the arrows: its structure is of interdigital type.

The major drawbacks of this channel plate or plate of interdigital structure are associated with the technique for producing them. Thus, these plate structures require a large thickness of material, typically from 5 to 10 mm, for the zone of collection of the gases produced and forming by machining in the bulk, of the gas distribution channels. A photographic representation of such a machined plate is given in FIG. 3. The material and machining costs are high and directly linked to the fineness of pitch of the channels to be machined: more particularly inter-channel distances of less than 1 mm.

The use of thin sheet metals, typically from 0.5 to 2 mm, drawn and then assembled together by laser welding has already been tested. A photographic representation of such a plate obtained by assembling drawn sheet metals is given in FIG. 4. This technique has the advantage of limiting the cost of starting material, but does not make it possible to achieve a channel fineness as high as that by machining. Specifically, the possibilities of production for the depth of the channels, the unit tooth width and the pitch between teeth are limited. Furthermore, the cost of the drawing tooling necessitates large-scale production.

A large number of developments have been achieved with the aim of improving the electrical contact between cells and interconnectors and the management of fluids to the cell.

U.S. Pat. No. 6,106,967 thus proposes a flat, thin (1-10 mm) interconnector made of metal (superalloy) and an electrochemical cell with electrodes bearing internal channels ensuring the distribution of the fluids. However, although this solution has the advantage of allowing good distribution of the fluids, it does not at all improve the quality of the electrical contact between the metal and the electrodes. Furthermore, such cells are complex and consequently expensive to produce.

Patent application US 2004/0 200 187 proposes to place between the electrodes and the flat metal separator (superalloy), a corrugated preformed structure made of metal (alloy based on chromium or alloy based on noble metals). This structure ensures the electrical contact between the electrodes and the separator. This solution has the drawback of being applied to the cathode compartment (SOCF) and thus of subjecting the corrugated preformed structure to substantial oxidation.

Patent application WO 2010/085248 proposes the addition of a porous metal layer welded to the machined interconnector. This layer is preferentially a nickel plate, which is placed on either side of the cell, i.e. in contact with the anode and the cathode. However, since it is integral attached to the interconnector made of a metal of different nature from the plate, this plate becomes deformed on increasing in temperature via the bimetal effect. The consequence of this bimetal effect is either the loss of the electrical contact or the degradation of the cell. Moreover, by placing a nickel plate in the cathode compartment (SOCF), its oxidation will lead to a high electrical resistance.

Patent application US 2002/0048700 proposes the use of a metal grate which may be placed between the electrodes and the flat interconnector. The purpose of this grate is to improve the distribution of the gases toward the electrodes. It is also placed on either side of the cell, i.e. in the oxidizing (cathode) and reducing (anode) compartments. The metals preferentially selected are nickel or copper. However, on account of the poor oxidation resistance in oxidizing medium, the nickel or copper or alloys thereof gives rise to the formation of a highly resistive oxide layer. This solution is therefore unviable.

Patent application CA 2 567 673 proposes the deposition of layers onto a flat interconnector. The layers are deposited from a suspension composed of a solvent, polymers and a primary phase and a secondary phase intended to adjust the thermomechanical behavior (coefficient of thermal expansion) to that of the electrochemical cell. On the anode side, the primary phase is preferably made of Ni, Ag, Au, Pt, Pd, Rh, Cu, Co or oxides thereof or doped cerium oxide or of other conductive oxides. The secondary phase may be oxides such as $Al_2O_3$, MgO, $TiO_2$, manganese oxides or $ZrO_2$. On the cathode side, the primary phase is composed of manganite, or more broadly of conductive perovskite. The secondary phase is composed of noble metals or of oxides such as CuO, $La_2O_3$, SrO, or of manganese or cobalt oxides. The suspension may be applied via various processes such as dipping, spraying or screen printing. A heat treatment (600-1000° C.) makes it possible to remove the organic materials. Although this solution has the advantage of providing materials that are specifically suited to the anode and cathode compartments, it does not afford fluid management of the gases between the flat interconnector and the electrodes. Furthermore, on account of the high compactness of the residual layer after heat treatment, the loss of pressure generated by the layers is detrimental to good functioning of the cells.

There is thus a need to improve the interconnectors for SOFC cells or HTE electrolyzers, especially in order to make their manufacturing technique simpler and less expensive, to ensure good distribution of the gases toward the electrodes, to allow good accommodation of the thermomechanical differences between interconnectors and electrochemical cells, to protect the cathode (SOFC) against the diffusion of chromium (Cr) originating from the oxidation of the interconnector, and to obtain good electrical contact between the electrodes and the interconnector.

One aim of the invention is to at least partly satisfy this need.

Another aim of the invention is to propose an interconnector that makes it possible to achieve the proceeding aim and that is inexpensive to produce.

SUMMARY OF THE INVENTION

To do this, the invention relates, in one of its aspects, to a component comprising a substrate made of metal alloy, of chromia-forming type, the base element of which is iron (Fe) or nickel (Ni), the substrate having two main flat faces, one of the main flat faces being coated with a coating comprising a thick ceramic layer, said thick ceramic layer being grooved, delimiting channels that are suitable for distributing and/or collecting gases, such as $H_2O$ steam, $H_2$; air.

The invention also relates to a component comprising a substrate made of metal alloy, of chromia-forming type, the base element of which is iron (Fe) or nickel (Ni), the substrate having two main flat faces, one of the main flat faces being coated with a thick metallic layer, said thick metallic layer being grooved, delimiting channels that are suitable for distributing and/or collecting gases, such as $H_2O$ steam, $H_2$; $O_2$, draining gas.

According to one embodiment, one of the main flat faces is coated with a coating comprising a thick ceramic layer and the other of the main flat faces is coated with a thick metallic layer, each of the thick layers being grooved, delimiting channels that are suitable for distributing and/or collecting gases, such as $H_2O$ steam, draining gas, air, $O_2$, $H_2$.

It is pointed out that, in the context of the invention, the term "thick layer" means a layer whose thickness is greater than that of a layer obtained via a "thin-layer" technique, typically the thickness is between 2 and 15 µm.

The term "chromia-forming" has here, and in the context of the invention, the usual meaning, i.e. a substrate made of metal alloy containing chromium. Reference may be made to paragraph 1.4 on page 30 of publication [9] to see the usual meaning of this definition.

Preferably, the material of the thick ceramic layer is chosen from a lanthanum manganite of formula $La_{1-x}Sr_xMO_3$ with M (transition metals)=Ni, Fe, Co, Mn, Cr, alone or as a mixture, or materials of lamellar structure such as lanthanide nickelates of formula $Ln_2NiO_4$ (Ln=La, Nd, Pr), or another electrically conductive perovskite oxide.

Preferably also, the material of the thick metallic layer is chosen from nickel (Ni) and alloys thereof, and also all the chromia-forming alloys whose base element is iron (Fe).

Advantageously, the thickness of the ceramic layer is between 60 and 500 µm.

Advantageously also, the thickness of the metallic layer is between 60 and 500 µm.

The chromia-forming metal alloy of the substrate may be chosen from ferritic (Fe—Cr), austenitic (Ni—Fe—Cr) stainless-steel alloys or superalloys based on nickel forming at the surface a layer of chromium oxide $Cr_2O_3$, known as the chromia layer.

According to an advantageous implementation variant, the substrate consists of at least one thin sheet, in which the thickness of a thin sheet is preferably between 0.1 and 1 mm.

According to another advantageous implementation variant, the substrate consists of a single plate with flat main faces, the thickness of which is preferably between 1 and 10 mm.

According to one envisaged application, the component according to the invention constitutes a constituent an interconnector of a high-temperature electrolysis (HTE) reactor comprising a stack of elementary electrolysis cells each formed from a cathode, an anode and an electrolyte intercalated between the cathode and the anode, the thick grooved ceramic layer being in contact with the anode of one of two adjacent elementary cells, the thick grooved metallic layer being in contact with the cathode of the other of the two adjacent elementary cells.

According to another envisaged application, the component constitutes an interconnector of a fuel cell (SOFC) comprising a stack of elementary cells each formed from a cathode, an anode and an electrolyte intercalated between the cathode and the anode, the thick grooved ceramic layer being in contact with the cathode of one of two adjacent elementary cells, the thick grooved metallic layer being in contact with the anode of the other of the two adjacent elementary cells.

An interconnector according to the present invention is more advantageous than an interconnector according to the prior art, since the coating with a thick ceramic layer on a main face and with, where appropriate, a thick metallic layer on the other main face has a flexible nature. The thick ceramic and metallic layers according to the invention are in raw form in the interconnector, i.e. not dense. They therefore have mechanical adaptability. This is a fundamental advantage in the case of an HTE electrolyzer or an SOFC fuel cell in each of which it is necessary to apply a compression force (load) to ensure leaktightness between the various cells constituting the stack. Thus, as a thick layer, the deposition of a ceramic or metallic strip will be able to become adapted or deformed, when the load is applied to the stack. By means of this, the adjustment imperfections between the various components of the stack (interconnectors and electrochemical cells) may thus be compensated for by these adaptations (deformations) of the thick layers.

The channels produced in the context of the invention: the width of the channels is thus advantageously between 0.15 and 5 mm, where as the depth of the channels is advantageously between 0.1 and 0.5 mm.

In another of its aspects, a subject of the invention is also a process for preparing a component, intended to constitute an interconnector for a fuel cell (SOFC) or a high-temperature electrolyzer (HTE), comprising the following steps:

a/ preparing a substrate made of metal alloy, of chromia-forming type, the base element of which is iron (Fe) or nickel (Ni), the substrate having two main flat faces, b1/ coating one of the flat faces of the substrate with a thick ceramic layer;

c1/ grooving the thick ceramic layer so as to delimit channels that are suitable for distributing and/or collecting gases, such as $H_2O$ steam, $H_2$; air.

A subject of the invention is also a process for preparing a component, intended to constitute an interconnector for a fuel cell (SOFC) or a high-temperature electrolyzer (HTE), comprising the following steps:

a/ preparation of a substrate made of metal alloy, of chromia-forming type, the base element of which is iron (Fe) or nickel (Ni), the substrate having two main flat faces, b2/ coating one of the flat faces of the substrate with a thick metallic layer;

c2/ grooving the thick metallic layer so as to delimit channels that are suitable for distributing and/or collecting gases, such as $H_2O$ steam, $H_2$; air.

According to one embodiment, with steps b1/ and c1/ performed on one flat face of the substrate, steps b2/ and c2/ are performed on the other flat face of the substrate.

According to an advantageous implementation variant, prior to step b1/ and/or step b2/, the thick ceramic or metallic layer is obtained by pouring in a strip, step b1/ and/or b2/ consisting of hot-bonding or hot-pressing or chemical bonding of the strip onto one or the other of the faces of the substrate.

Thus, as regards the preparation of the ceramic strip, the suspension containing the ceramic powder, the solvents, dispersants, binders and plasticizers is poured onto a non-stick support. After evaporating off the solvents, said crude strips are obtained.

According to this variant, step b1/ consists of hot-pressing or hot-bonding of the crude ceramic strip at a temperature of between 60 and 130° C. This temperature range is advantageous since these temperatures are high enough to obtain softening of the polymeric binders contained in a ceramic strip but not too high so as not to thermally degrade them.

According to another implementation variant, step b1/ and/or b2/ consists of screen printing in thick layers of a ceramic or metallic paste onto one or other of the faces of the substrate.

As regards the grooving in order to delimit the channels, according to a first variant, step c1/ may be performed by calendaring the crude ceramic strip obtained by pouring between two rolls heated to the softening point of the polymers of the ceramic strip, at least one of the two rolls comprising ribs corresponding to the channels to be delimited, step b1/ being performed after step c1/.

According to a second variant, which may concern a thick ceramic layer and/or a thick metallic layer, step c1/ and/or c2/ may be performed by laser ablation once step b1/ and/or b2/, respectively, has been completed.

According to this second variant, step c1/ and/or c2/ is preferably performed using a $CO_2$ laser and more preferably completed after several passes of the laser over the thick layer.

The invention that has just been described has the following advantages:

reduction of the material cost of the metal alloy on account of the possibility of using a substrate made of thin or even very thin metal alloy when compared with those used as interconnectors according to the prior art, reduction or elimination of the cost of production of the channels when compared with mechanical machining or drawing of the interconnectors according to the prior art, increase of the fineness of definition of the channels for feeding the gases due to the possible laser ablation of the thick layers, possibility of depositing in a single step the "protective" layer and the "electrical contact" layer, improvement of the thermomechanical accommodation between the interconnector and an electrochemical cell due to the flexible nature of the crude layer assembled with the substrate made of metal alloy, production of a low electrical contact resistance of the thick ceramic layer equivalent to a gold grate.

DESCRIPTION OF THE FIGURES

Other advantages and characteristics of the invention will emerge more clearly on reading the detailed description of implementation examples of the invention given as nonlimiting illustrations in reference to the following figures, among which:

FIG. 7 is a schematic view in cross section of an interconnector coated according to the invention, FIG. 8 is a photographic reproduction of an example of a thick grooved ceramic layer hot-bonded onto a substrate made of ferritic alloy in accordance with the invention, FIG. 8A is a schematic view in cross section of FIG. 8 showing the considered dimensions of the channels of the thick ceramic layer, FIG. 9 shows the representative curves of the geometry of the grooves (furrows) obtained by $CO_2$ laser ablation on a thick ceramic layer, FIG. 10 shows the variation in profile of the grooves shown in FIG. 9 before and after testing under a compression load and at a temperature of 800° C., FIGS. 11A and 11B are photographic reproductions of a thick ceramic layer before and after testing under a compression load and at a temperature of 800° C., FIG. 12 illustrates the curves of serial resistance measurement of various thick ceramic layers according to the invention and, for comparative purposes, of gold grates, the gold grate and layers being in contact with a substrate made of metal alloy.

DETAILED DESCRIPTION

FIGS. 1 to 4 have already been commented on in the preamble. They are therefore not described in detail hereinbelow.

Figure 5:
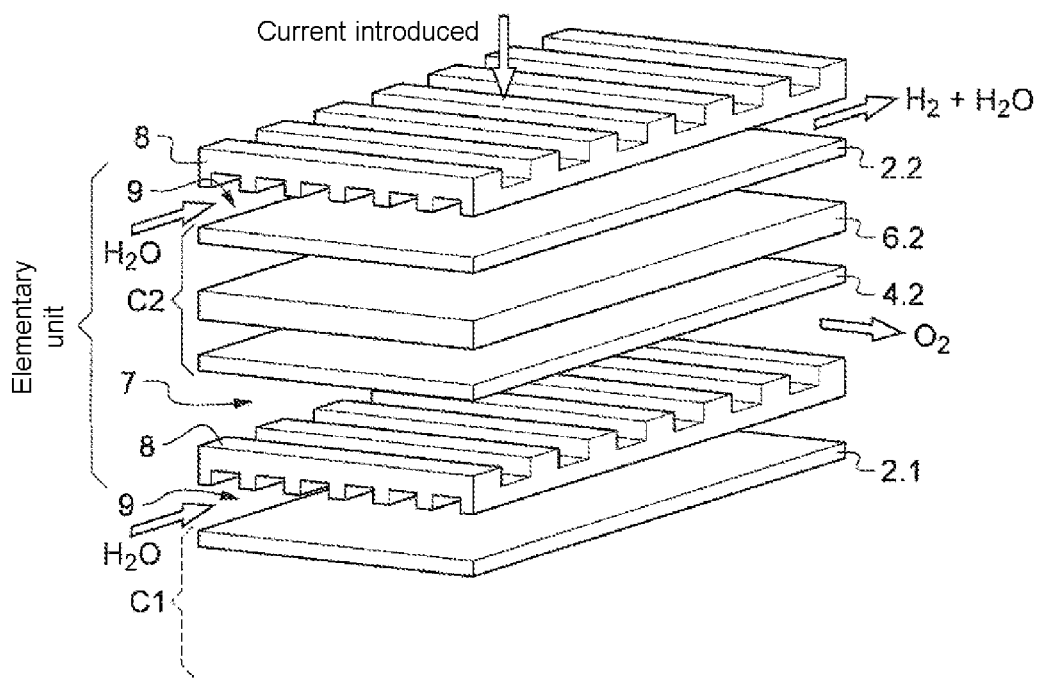
FIG. 5 is an exploded schematic view of part of a high-temperature electrolyzer comprising interconnectors according to the prior art.

FIG. 5 represents an exploded view of elementary units of a high-temperature steam electrolyzer according to the prior art. This HTE electrolyzer comprises a plurality of elementary electrolysis cells C1, C2 ... stacked alternatively with interconnectors 8. Each cell C1, C2, ... consists of a cathode 2.1, 2.2, ... and of an anode 4.1, 4.2, between which is placed an electrolyte 6.1, 6.2, .... The symbols and arrows indicating the path of steam, of dihydrogen and of oxygen, of the current are shown in this FIG. 5 for reasons of clarity.

In an HTE electrolyzer, an interconnector 8 is a component made of metal alloy which provides the separation between the anode 7 and cathode 9 compartments, defined by the volumes between the interconnector 8 and the adjacent anode 4.2 and between the interconnector 8 and the adjacent cathode 2.1, respectively. They also ensure the distribution of the gases to the cells. The injection of steam in each elementary unit takes place in the cathode compartment 9. The collection of the hydrogen produced and of the residual steam at the cathode 2.1, 2.2 is performed in the cathode compartment 9 downstream of the cell C1, C2 after dissociation of the steam therefrom. The collection of the oxygen produced at the anode 4.2 is performed in the anode compartment 7 downstream of the cell C1, C2 after dissociation of the steam therefrom.

Figure 1:
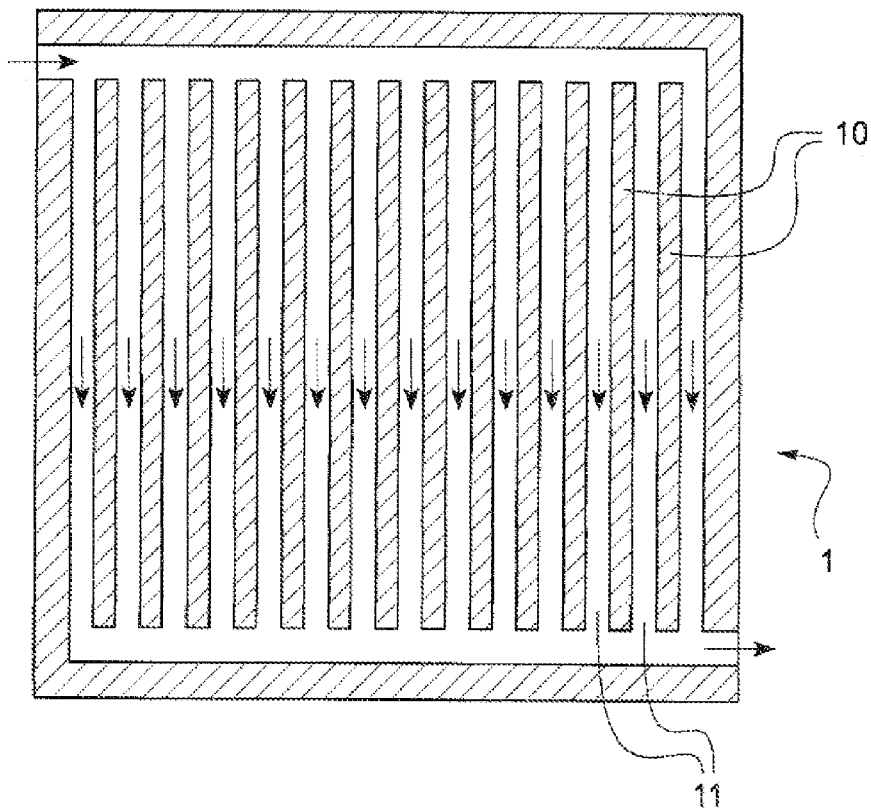
FIG. 1 is a schematic front view of an interconnecting plate of an HTE electrolyzer according to the prior art.
Figure 1A:
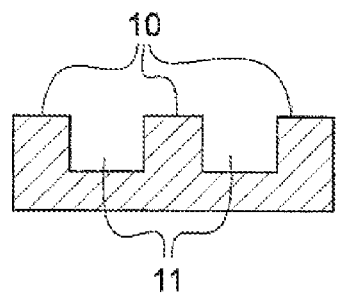
FIG. 1A is a detailed view in cross section of an interconnecting plate according to FIG. 1.
Figure 1B:
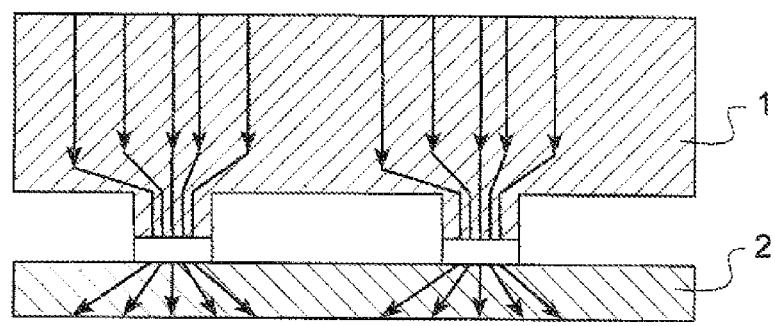
FIG. 1B is a view similar to that of FIG. 1A showing the current lines passing through the plate.
Figure 2:
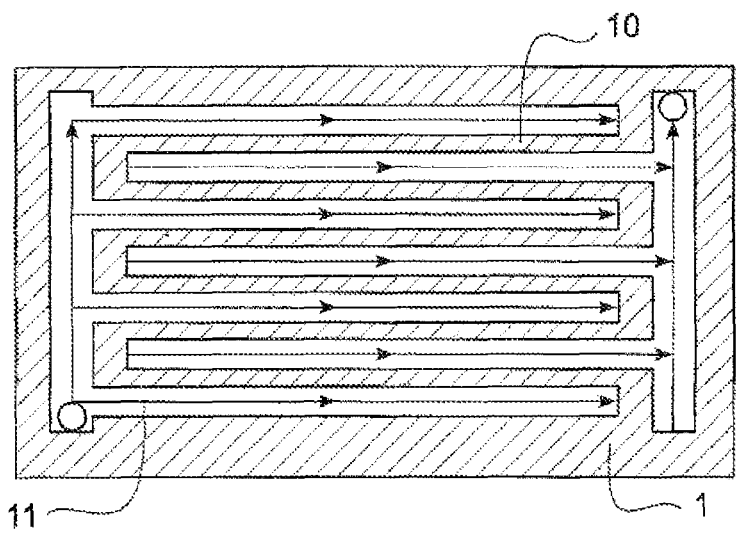
FIG. 2 is a schematic front view of another interconnecting plate of an electrolyzer according to the prior art.
Figure 3:
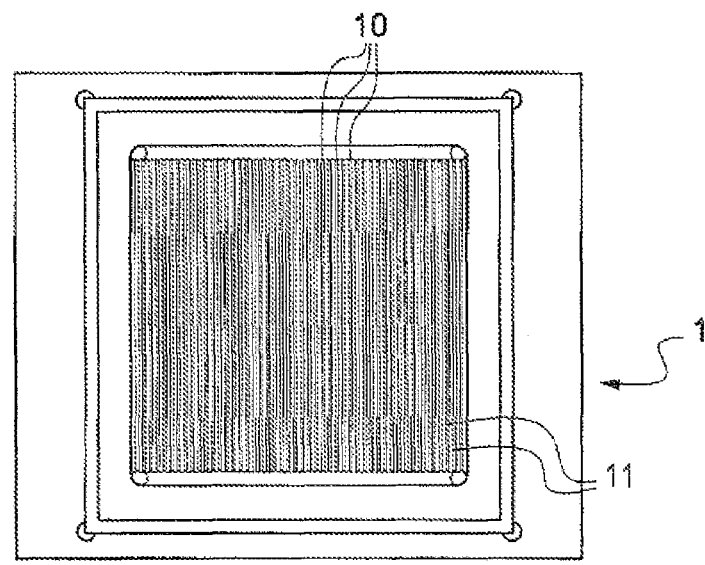
FIG. 3 is a photographic reproduction of a plate according to FIG. 1, obtained by mechanical machining.
Figure 4:
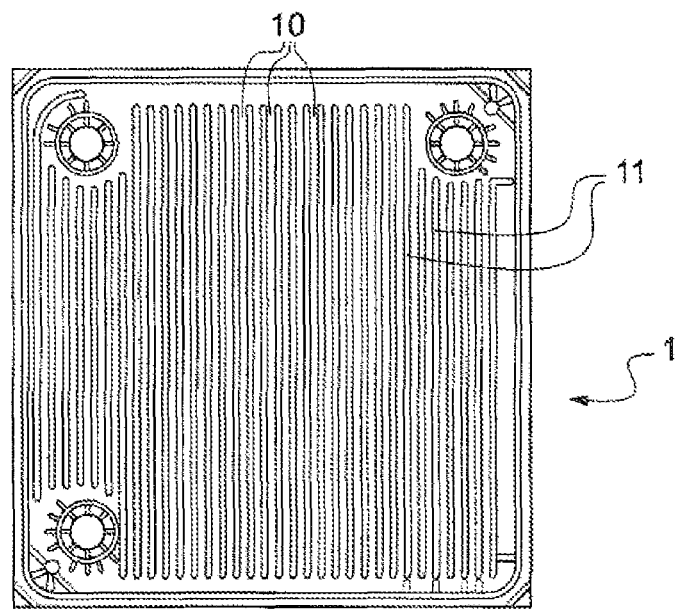
FIG. 4 is a photographic reproduction of a plate according to FIG. 1, obtained by drawing.

The interconnector 8 ensures the passage of the current between the cells C1 and C2 by direct contact with the adjacent electrodes, i.e. between the anode 4.2 and the cathode 2.1 (FIG. 1).

Figure 6:
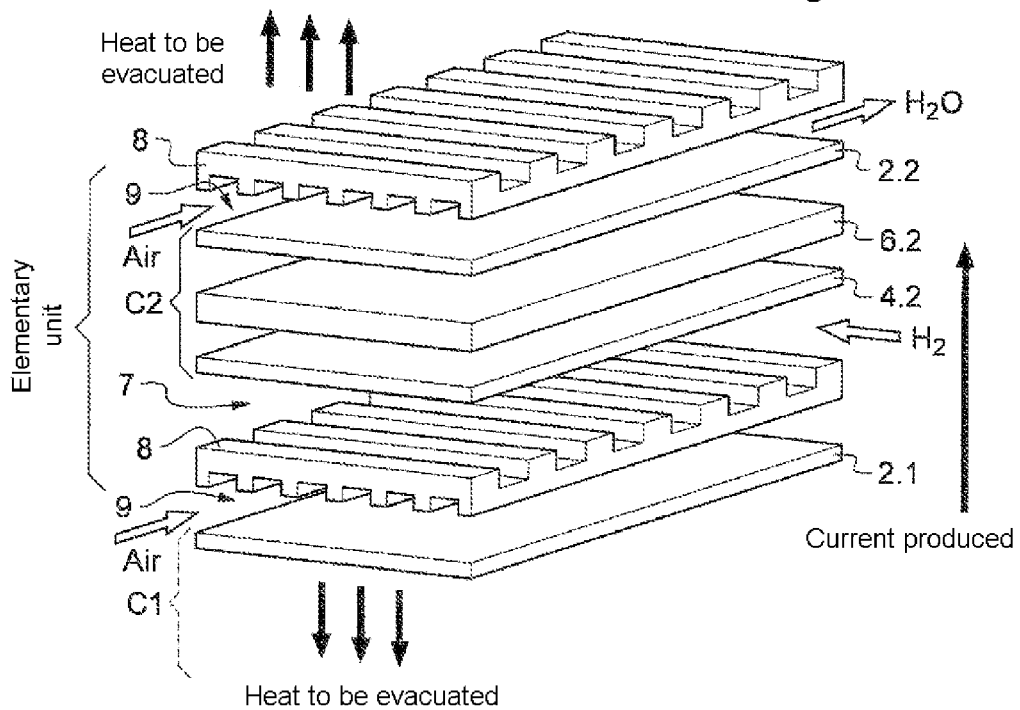
FIG. 6 is an exploded schematic view of part of an SOFC fuel cell comprising interconnectors according to the prior art.

FIG. 6 represents the same elementary units as those of FIG. 5, but for an SOFC fuel cell with elementary cells C1, C2 and the interconnectors 8. The symbols and arrows indicating the path of air, of dihydrogen and of oxygen, of the current are shown in this FIG. 6 for reasons of clarity.

The injection of air containing oxygen into each elementary unit takes place in the cathode compartment 9. The collection of the water produced at the cathode 2.1, 2.2 is performed in the cathode compartment 9 downstream of the cell C1, C2 after recombination of the water by the latter with the hydrogen $H_2$ injected at the anode 4.2 is performed in the anode compartment 7 upstream of the cell C1, C2. The current produced during the recombination of the water is collected by the interconnectors 8.

According to the prior art, these interconnectors 8 are usually prepared by mechanical machining of thick plates or by using thin metal sheets, typically from 0.5 to 2 mm, drawn and then assembled by laser welding. The material and machining costs are high. The production technique has the advantage of limiting the cost of starting material, but does not make it possible to achieve a channel fineness as high as that by machining. Specifically, the production possibilities for the depth of the channels, the unit tooth width and the pitch between teeth are limited. Furthermore, the cost of the drawing tooling necessitates large-scale production. In addition, the electrical contact between the electrodes and the interconnector is not entirely satisfactory in particular due to the lack of planarity of the electrodes.

Thus, to simplify the techniques for producing interconnectors for SOFC fuel cells or HTE electrolyzers and to make them less expensive, the inventors propose a novel type of interconnector 8, an example of which is represented in FIG. 7.

The component 8 constituting the novel interconnector according to the invention comprises a substrate 82 made of metal alloy, the base element of which is iron (Fe) or nickel (Ni), the substrate having two main flat faces, one of the main flat faces being coated with a coating comprising a thick ceramic layer 80 and the other of the main flat faces being coated with a thick metallic layer 81, each of the thick layers being grooved, delimiting channels 800, 810 suitable for the distribution and/or collection of gases, such as $H_2O$ steam, draining gas, air, $O_2$, $H_2$.

Optionally, a thin protective ceramic layer 83 may be intercalated between the thick ceramic layer 80 and the substrate 82.

When functioning in a HTE electrolyzer or an SOFC fuel cell, the working conditions are the same as those conventionally used: the circulation of a reducing gaseous mixture is performed in the channels 810 of the thick metallic layer 81 and that of an oxidizing gaseous mixture takes place in the channels 800 of the thick ceramic layer 80.

The various steps in the production of an example of a thick ceramic layer 80 with its channels 800 and various tests proving the possibility of its use in the targeted applications, i.e. SOFC fuel cells and HTE electrolyzers, are described below.

The example below is performed starting with a substrate 82 consisting of a single thin metal sheet made of commercial ferritic alloy of the CROFER 22 APU type.

Step 1/: Manufacture of a Crude LSM Strip

A mixture is prepared between a compound with a weight of 60 g of lanthanum manganite of formula $La_{0.8}Sr_{0.2}MnO_3$ with 0.8% by weight of oleic acid as dispersant, 15.7% of 2-butanone and 15.7% of ethanol as solvents.

The mixture is milled in a planetary mill. The operating cycle of the planetary mill is as follows:
 spin speed: 400 rpm;
 duration: 1 hour.

A weight of 3.2 g of polyvinyl butyral (PVB 90) and 5.5 g of polyethylene glycol (PEG 400) as solvent are then added to the milled mixture, and the whole is then mixed using a planetary mill. The operating cycle of the planetary mill is as follows:
 spin speed: 200 rpm;
 duration: 10 hours.

The mixture is then deaerated using a mixer of roll type. The operating cycle of the roll mixer is as follows:
 spin speed: 20 rpm;
 duration: 24 hours.

The suspension obtained after deaeration is then poured in a strip using a doctor blade. The active height of the blade is equal to 1000 µm. The pouring speed is equal to 1.5 m/min. The pouring is performed onto a sheet of silicone-treated polymer (polyester) so as to promote the detachment of the strip once dried.

Next, drying of the crude strip obtained by pouring is performed, in ambient air for a duration of 3 hours.

The dried crude strip of LSM is finally chopped to the sizes corresponding to an air electrode in an SOFC cell, against which the strip is intended to bear. The cutting may be performed, for example, using a laser cutting table.

Step 2/: Hot-Pressing

The crude strip of LSM is then placed on a thin sheet of ferritic steel 1.5 mm thick and is then welded thereto by hot-pressing using a press. The thickness of the crude strip of LSM is 325 µm. In the case where the thin protective ceramic layer 83 is added, the process is performed in an identical manner.

The operating cycle of the press is as follows:
 pressing force: 1 kg/mm$^2$;
 pressing duration: 2 hours;
 regulated temperature of the two press plates: 80° C.

After cooling to room temperature, the assembly prepared between the crude strip of LSM and the thin sheet of ferritic steel is removed from the press.

Step 3/: Production of the Grooves

Grooving is performed by laser ablation of the crude strip of LSM. The ablation is performed using a flatbed plotter equipped with a $CO_2$ laser of variable power up to a maximum power of 50 watts. The speed of movement of the laser is also variable, up to a maximum speed of 2 cm/s. The use of such a machine is particularly advantageous since it makes it possible by means of its variable operating characteristics to burn, i.e. to perform abrasion, more or less deeply the polymers constituting the crude strip, which thus releases the associated charge, the LSM. More or less deep grooves (furrows) may thus be dug. Where appropriate, several passes of the $CO_2$ laser over the crude strip may be performed to increase the depth and/or width of the grooves to a greater or lesser extent.

FIG. 8 is a photographic reproduction of a thick layer of LSM grooved and hot-bonded onto a substrate consisting of a single sheet of CROFER 22 APU according to the invention. The photographed layer has, for example, a surface area of 100 $cm^2$.

FIG. 9 shows the representative curves of the geometry of grooves (furrows), i.e. their height and their width, derived from a number, respectively, of two and four passes of the $CO_2$ laser. Thus, the widths L1 of the teeth 801 obtained may be reduced to 150 μm and those L2 of the channels 800 may be reduced to 150 μm. It goes without saying that the widths L1, L2 may be greater than 150 μm.

It is pointed out here that the height zero corresponds to the interface with the thin sheet of ferritic steel and that each of the geometries was obtained by adjusting the speed of movement of the laser to a value equal to 40% of the maximum speed indicated above and the power to a value equal to 50% of the maximum power indicated above (50 W).

During its use, i.e. when it constitutes an interconnector in a stack either of a high-temperature electrolysis (HTE) reactor or of an SOFC fuel cell, the metal component coated with the thick layer of LSM obtained in the example described above is placed under a compression load in the stack so as to ensure the electrical contact with the other elements of the stack and in particular the cathode of an SOFC cell. Moreover, under HTE conditions, it may be subjected to high temperatures of between 600° C. and 900° C.

To confirm the good thermomechanical behavior under a compression force, a test was performed according to which the LSM layer was subjected to a temperature of 800° C. and to a load of 0.2 MPa.

FIG. 10 shows the representative curves of the geometry of grooves (furrows) before and after the 0.2 MPa load. From this figure, it emerges that the crude layer of LSM is crushed by only about 15 μm. This proves that the crude layer of LSM can be perfectly adapted mechanically to an electrochemical cell of an HTE reactor or SOFC fuel cell, under the high working temperature conditions. In other words, the crude nature of the LSM layer makes it possible to have a good thermomechanical behavior which implies a good mechanical contact with an electrochemical cell despite the possible surface imperfections of the latter.

FIGS. 11A and 11B are three-dimensional representations of the LSM layer before and after, respectively, the test at 800° C. under a 0.2 MPa load. It is clearly seen that the crude layer of LSM remains integral after use due to its sufficiently high mechanical strength.

In addition, measurements of the serial resistance with the component made of metal alloy were performed to characterize the electrical conductivity of the LSM layer obtained under representative operating conditions simulating the entry of cathode compartments 9 of an SOFC cell. The measuring method used is the "four-point" method as explained in publication [8].

To do this, several samples were prepared all from a stainless-steel component, the samples according to the invention Nos. 1 to 4 consisting of an assembly of the component with an LSM layer by hot-pressing, the comparative samples Nos. 5 to 6 consisting of an assembly of the component with a gold grate.

It is pointed out that in sample No. 1, the LSM layer lacks channels, whereas in samples Nos. 2 to 4, the LSM layer is grooved defining identical channels with a unit width L1 equal to 1 mm, two adjacent channels being spaced by a tooth or rib of unit width L2 equal to 0.25 mm.

FIG. 12 shows the results of measurement of the serial resistance of the various samples as a function of time. It is pointed out here that the measuring points between about 7 hours and 10 hours have not been reported in FIG. 12. The thickness of the LSM layers in samples Nos. 1 to 4 is 325 μm, whereas the thickness of the grates in samples Nos. 5 and 6 is 500 μm.

From these measurements, it is deduced that the serial resistances are virtually identical between all the samples Nos. 1 to 6. It may therefore be concluded that the contact resistance of a thick LSM layer according to the invention is close or even equal to that of a gold grate, which is the mechanical element known to date as having the lowest contact resistance. In other words, an LSM layer according to the invention has a negligible electrical contact resistance, of less than 10 mΩ·$cm^2$.

Other measuring tests were performed beyond 24 hours, but with a stack of electrochemical cells, of interconnectors according to the invention and of contacts. These tests were satisfactory.

The production of a thick metallic layer according to the invention on the face of a metal substrate opposite that comprising the thick ceramic layer may be performed in a similar manner to that which has been described, i.e. with pouring in a strip, followed by hot-pressing and production of grooves by ablation using a $CO_2$ laser.

The invention is not limited to the examples that have just been described; in particular, characteristics of the examples illustrated may be combined within variants not shown.

REFERENCES

[1]. J. W. Fergus, "*Metallic interconnects for solid oxide fuel cells*", Mater. Sci. Eng. A 397 (2005) 271-283.

[2]. W. J. Quadakkers, J. Piron-Abellan, V. Shemet, L. Singheiser, "*Metallic interconnectors for solid oxide fuel cells—a review*", Mat. High Temp. 20 (2) (2003) 115-127.

[3]. Z. Yang, K. Scott Weil, D. M. Paxton, J. W. Stevenson, "*Selection and Evaluation of Heat-Resistant Alloys for SOFC Interconnect Applications*", J. Electrochem. Soc. 150 (9) (2003) A1188-A1201.

[4]. J. E. Hammer, S. J. Laney, R. W. Jackson, K. Coyne, F. S. Pettit, G. H. Meier, "*The Oxidation of Ferritic Stainless Steels in Simulated Solid-Oxide Fuel-Cell Atmospheres, Oxid. Met*". 67(1/2) (2007) 1-38.

[5]. S. J. Geng et al., "*Investigation on Haynes 242 Alloy as SOFC Interconnect in Simulated Anode Environment*», Electrochemical and Solid-State Letters, 9 (4) (2006) A211-A214.

[6]. N. Shaigan et al., "*A review of recent progress in coatings, surface modifications and alloy developments* for solid oxide fuel cell ferritic stainless steel interconnects", J. Power Sources 195 (2010) 1529-1542.

[7]. Xiango Li, International Journal of hydrogen Energy 30 (2005) 359-371.

[8]. S. Fontana, R. Amendola, S. Chevalier, P. Piccardo, G. Caboche, M. Viviani, R. Molins, M. Sennour, "*Metallic interconnects for SOFC: Characterisation of corrosion resistance and conductivity evaluation at operating temperature of differently coated alloys*", J. Power Sources 171 (2007) 652-662.

[9]. Maria Rosa ARDIGO, "*Optimisation d'interconnecteurs métalliques pour la production d'hydrogène par électrolyse de la vapeur d'eau a haute température (EVHT)* [Optimization of metallic interconnectors for the production of hydrogen by high-temperature steam hydrolysis (HTSE)]", doctoral thesis defended on Sep. 9 2012, http://nuxeo.u-bourgogne.fr/nuxeo/site/esupversions/9a356817-2ef1-4b4e-863e-8fa66b4c4a73

The invention claimed is:

1. A process for preparing a fuel cell (SOFC) or a high-temperature electrolyzer (HTE), comprising the following steps:
   a/ preparing a substrate made of metal alloy, of chromia-forming type, the base element of which is iron (Fe) or nickel (Ni), the substrate having two main flat faces;
   b/ coating one of the flat faces of the substrate with a thick ceramic layer in a green state and coating the other flat face of the substrate with a thick metallic layer in a green state;
   c/ grooving the thick ceramic layer and the thick metallic layer so as to delimit channels that are suitable for distributing and/or collecting gases; and
   d/ forming a stack of elementary electrolysis cells each formed from a cathode, an anode and an electrolyte intercalated between the cathode and the anode;
   wherein:
   to prepare an HTE reactor, the thick grooved ceramic layer in a green state is in contact with the anode of one of two adjacent elementary cells, and the thick grooved metallic layer in a green state is in contact with the cathode of the other of the two adjacent elementary cells; or
   to prepare an SOFC, the thick grooved ceramic layer in a green state is in contact with the cathode of one of two adjacent elementary cells, and the thick grooved metallic layer in a green state is in contact with the anode of the other of the two adjacent elementary cells;
   e/ applying a compression force to the stack of elementary electrolysis cells to form the HTE reactor or SOFC, wherein the compression force causes one or more ceramic layer and/or metallic layer to be deformed such that any imperfections between the elementary electrolysis cells in the stack are compensated for by the deformation of the layer; and
   f/ obtaining an HTE reactor or SOFC.

2. The process as claimed in claim 1, in which, prior to step b, the thick ceramic or metallic layer is obtained by tape casting, step b comprising hot-bonding or hot-pressing or chemical bonding of the strip to one or other of the faces of the substrate.

3. The process as claimed in claim 2, step b comprising hot-pressing or hot-bonding of the green ceramic strip at a temperature of between 60 and 130° C.

4. The process as claimed in claim 1, wherein step b comprises screen printing in thick layers of a ceramic or metallic paste onto one or other of the faces of the substrate.

5. The process as claimed in claim 1, wherein step c comprises calendaring a green ceramic strip obtained by tape casting between two rolls heated to the softening point of the polymers of the ceramic strip, at least one of the two rolls comprising ribs corresponding to the channels to be delimited.

6. The process as claimed in claim 1, wherein step c is performed by laser ablation once step b has been completed.

7. The process as claimed in claim 6, wherein step c is performed using a $CO_2$ laser.

8. The process as claimed in claim 6, wherein step c is completed after several passes of the laser over the thick layer.

9. The process as claimed in claim 1, wherein the thick ceramic layer comprises a lanthanum manganite of formula $La_{1-x}Sr_xMO_3$ with M (transition metals)=Ni, Fe, Co, Mn, Cr, alone or as a mixture, or materials of lamellar structure such as lanthanide nickelates of formula $Ln_2NiO_4$ (Ln=La, Nd, Pr), or another electrically conductive perovskite oxide.

10. The process as claimed in claim 1, wherein the thick metallic layer comprises nickel (Ni) or an alloy thereof or a chromia-forming alloy whose base element is iron (Fe).

11. The process as claimed in claim 1, wherein the thickness of the ceramic or metallic layer is between 60 and 500 μm.

12. The process as claimed in claim 1, wherein the chromia-forming metal alloy of the substrate is chosen from ferritic (Fe-Cr), austenitic (Ni—Fe-Cr) stainless-steel alloys or superalloys based on nickel forming at the surface a layer of chromium oxide $Cr_2O_3$, known as the chromia layer.

13. The process as claimed in claim 1, wherein the substrate consists of at least one sheet, wherein the thickness of the at least one sheet is between 0.1 mm and 1 mm.

14. The process as claimed in claim 1, wherein the substrate consists of a single plate with flat main faces.

15. The process as claimed in claim 14, wherein the thickness of the plate is between 1 and 10 mm.

16. The process as claimed in claim 1, wherein the width of the channels is between 0.15 and 5 mm.

17. The process as claimed in claim 1, wherein the depth of the channels is between 0.1 and 0.5 mm.

\* \* \* \* \*